US011983568B2

(12) United States Patent
Zhu

(10) Patent No.: US 11,983,568 B2
(45) Date of Patent: May 14, 2024

(54) ALLOCATION OF HETEROGENEOUS COMPUTATIONAL RESOURCE

(71) Applicant: Kabushiki Kaisha Toshiba, Tokyo (JP)

(72) Inventor: Ziming Zhu, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 469 days.

(21) Appl. No.: 17/238,670

(22) Filed: Apr. 23, 2021

(65) Prior Publication Data

US 2022/0365826 A1 Nov. 17, 2022

(51) Int. Cl.
*G06F 9/50* (2006.01)
*G06F 9/48* (2006.01)

(52) U.S. Cl.
CPC .......... *G06F 9/5038* (2013.01); *G06F 9/4856* (2013.01); *G06F 9/4881* (2013.01); *G06F 9/5088* (2013.01)

(58) Field of Classification Search
CPC .... G06F 9/5083; G06F 9/4856; G06F 9/4881; G06F 9/5088; G06F 9/5072; G06F 9/5027; G06F 2209/509
See application file for complete search history.

(56) References Cited

U.S. PATENT DOCUMENTS

| | | | | |
|---|---|---|---|---|
| 2002/0095367 A1* | 7/2002 | Mizunuma | ......... | H04N 21/6373 348/E7.071 |
| 2002/0144016 A1* | 10/2002 | Spicer | ..................... | H04L 67/51 719/321 |
| 2002/0199081 A1* | 12/2002 | Satou | ..................... | G06F 9/3802 712/E9.055 |
| 2004/0255048 A1* | 12/2004 | Lev Ran | ............... | H04L 67/563 709/201 |
| 2007/0294435 A1* | 12/2007 | Huang | .................... | H04L 47/20 709/251 |
| 2009/0157998 A1* | 6/2009 | Batterywala | ............ | G06F 3/067 711/171 |
| 2014/0289207 A1* | 9/2014 | Moloian | ............. | G06F 16/2365 707/687 |

(Continued)

FOREIGN PATENT DOCUMENTS

| | | |
|---|---|---|
| CN | 105786622 A | 7/2016 |
| CN | 110098969 A | 8/2019 |

OTHER PUBLICATIONS

Mao et al., "Matching Game Based Resource Allocation for 5G H-CRAN Networks with Device-to-Device Communication", 2017 IEEE 28th Annual International Symposium on Personal, Indoor, and Mobile Radio Communications (PIMRC), 2017, 6 pages.

*Primary Examiner* — Tuan C Dao
(74) *Attorney, Agent, or Firm* — Oblon, McClelland, Maier & Neustadt, L.L.P.

(57) ABSTRACT

In a computing system in which resources are available for performance of computing tasks allocated to them, and tasks are requested by requesting computers, a scheduler is associated with each of the requesting computers, to enable that computer to obtain resource for performance of the tasks. Each scheduler obtains resources, in accordance with a locally formulated preference list of resources, on the basis of scheduling tokens issued by resources indicative of reciprocal prioritisation of tasks by resources.

10 Claims, 7 Drawing Sheets

(56) References Cited

U.S. PATENT DOCUMENTS

| | | | |
|---|---|---|---|
| 2014/0289793 A1* | 9/2014 | Moloian | G06F 16/283 726/1 |
| 2014/0301223 A1* | 10/2014 | Wong | H04L 1/1825 370/252 |
| 2015/0317189 A1* | 11/2015 | Georgescu | G06F 9/50 718/104 |
| 2016/0063658 A1* | 3/2016 | Breazeale, Jr. | G16H 15/00 705/2 |
| 2016/0255139 A1* | 9/2016 | Rathod | H04N 1/32101 709/203 |
| 2017/0147395 A1* | 5/2017 | Bates | G06F 9/485 |
| 2017/0374177 A1* | 12/2017 | Chrysanthakopoulos | H04L 67/10 |
| 2019/0043148 A1* | 2/2019 | Vemury | G06K 19/06037 |
| 2020/0026264 A1 | 1/2020 | Zhu et al. | |

* cited by examiner

ALLOCATION OF HETEROGENEOUS COMPUTATIONAL RESOURCE

FIELD

The present disclosure is in the field of computing. Specifically, it relates to the allocation of tasks to computational resource in a heterogeneous computer network.

DRAWINGS

DESCRIPTION OF EMBODIMENTS

Cloud computing is a term used to denote any form of computing making use of a remote computing resource. The remote computing resource may comprise one computer, or a plurality of computers in network with each other.

Parallel processing and edge computing are two frameworks which enable computing tasks to be performed in an efficient manner. Parallel processing provides the ability to process multiple tasks at the same time using a number of computing processors, while edge computing allows computing tasks to run using available local resources rather than a centralised cloud.

Combining parallel processing with edge computing offers an opportunity to implement fast and massive local data processing, which can bring benefits such as low processing latency, reduced data traffic in a core communication network, and enhanced data privacy.

One important issue is how to efficiently allocate available local computational resources to meet demand. One approach is to allocate tasks to local computational resources at random. While this approach is simple to implement, it exhibits low efficiency and does not provide quality of service (QoS). On the other hand, allocating tasks to computational resources using a centralized optimisation based scheduling method will usually be complicated, and can involve operational overhead which can easily outweigh the benefit of a more considered approach to task/resource allocation.

Embodiments described herein describe a computing environment comprising several user devices which generate data processing demand, and a number of computing resources including those within the edge network and the cloud. Resource allocation matching is conducted by virtual entities (which provide a scheduling process) sitting between the user devices and the computing resource network, collecting the demand side requirements, performing the matching, and establishing the connection from the computing tasks (users) and the matched resources.

The virtual entities can be considered as an access gateway to the computing network. In the described embodiments, one such virtual entity is provided per user/task/application, responsible for finding the optimal processing resource, within the network of its scope, for that demand. Virtual entities (schedulers) do not need to communicate with each other, which is a feature that can be used to ensure the security of an individual's identity and operational information. This has performance advantages in terms of data privacy.

Figure 1:
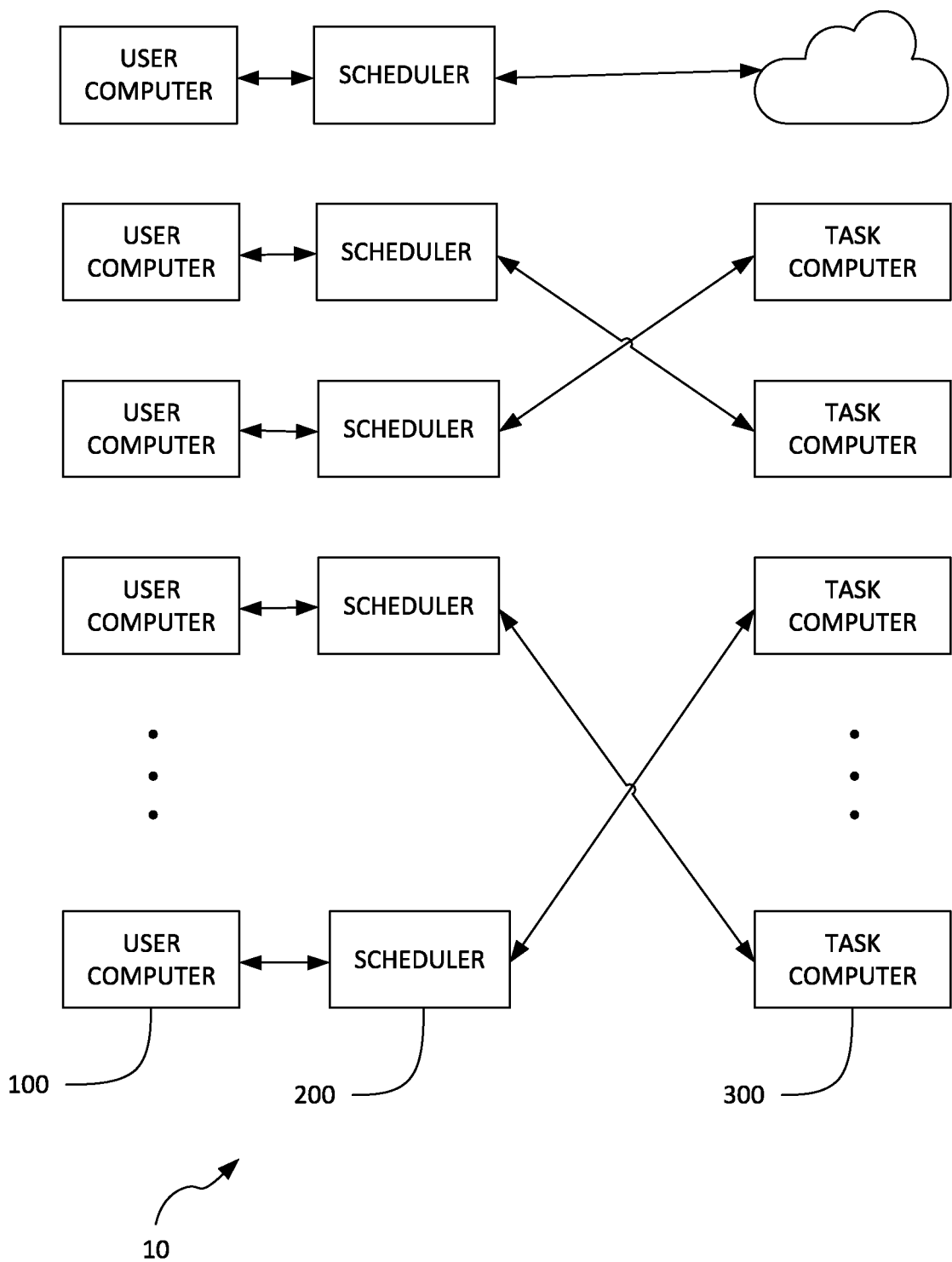
FIG. 1 is a schematic diagram of a general arrangement of computers in accordance with an embodiment.

FIG. 1 illustrates a network arrangement 10 in accordance with an embodiment.

As FIG. 1 shows, a plurality of user computers 100 are allocated with respective schedulers 200. Schedulers 200 are networked with a plurality of task computers 300. Active network links are established between the user computers 100 and the task computers 300 by their respective schedulers 200 by way of a matching process to be described below. A user computer 100 that requires a task to be performed by a task computer 300 can obtain access to computational resource from task computers 300 on the basis of the matching process performed by its scheduler 200 in cooperation with the task computers 300.

Each of the illustrated computers is a general purpose computer of conventional construction. The computers host executable program instructions to enable the performance of the matching process, to cause allocation at the schedulers 200 of tasks requested by a user computer 100 to be performed by a task computer 300.

Figure 2:
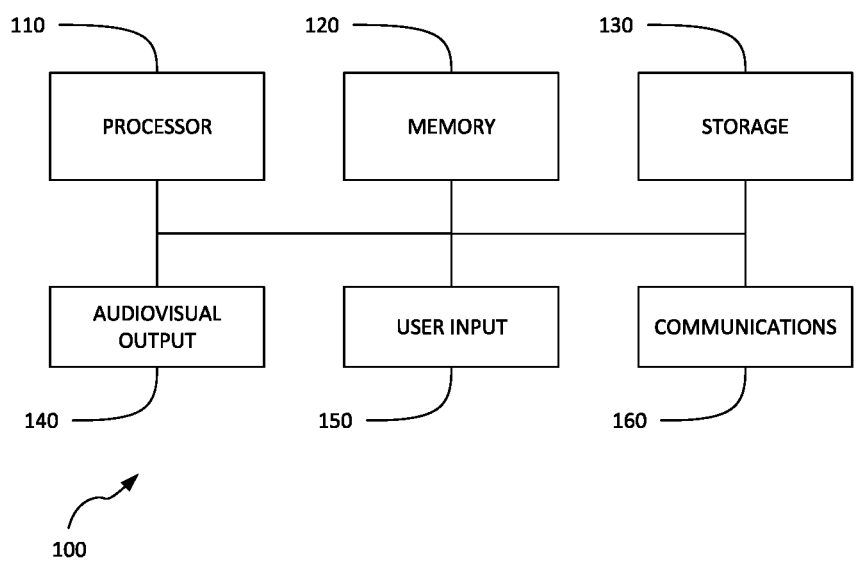
FIG. 2 is a schematic architecture of a user computer of FIG. 1.

So, as shown in FIG. 2, the user computer 100 comprises a processor 110, a memory 120 for short term retention of processing data, and storage 130 for long term (but potentially slow retrieval) storage of program, processing and informational data. In conventional implementations, the storage 130 may comprise a magnetic drive, or a solid-state storage device. An audio-visual output facility 140 is provided, such as a visual display unit and speakers, for display and audio output to a user, and a user input device 150, such as a keyboard, pointing device (e.g. mouse) and microphone are provided to enable user input action to the user computer 100. A communications facility 160 provides connection to other computers, such as by Ethernet connection.

The user computer 100 stores and executes a user computer task execution request program, which enables the user computer 100 to request a task to be performed by a task computer, in accordance with a matching process executed at the schedulers 200. The task execution request program can be introduced to the user computer 100 by way of a download computer program product, or a storage medium computer program product; this is implementation specific.

Figure 3:
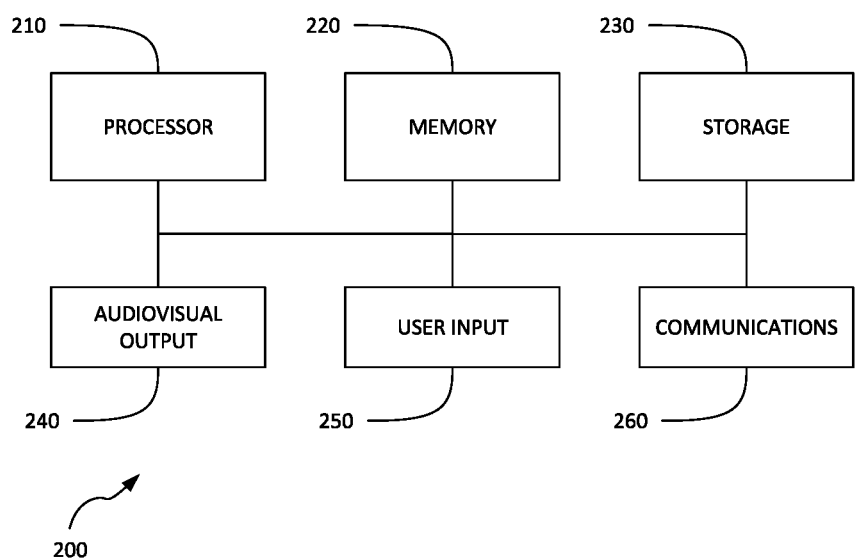
FIG. 3 is a schematic architecture of a scheduler of FIG. 1.

As shown in FIG. 3, each scheduler 200 comprises a processor 210, a memory 220 for short term retention of processing data, and storage 230 for long term (but potentially slow retrieval) storage of program, processing and informational data. In conventional implementations, the storage 230 may comprise a magnetic drive, or a solid-state storage device. An audio-visual output facility 240 is provided, such as a visual display unit and speakers, for display and audio output to a user, and a user input device 250, such as a keyboard, pointing device (e.g. mouse) and microphone are provided to enable user input action to the scheduler 200. A communications facility 260 provides connection to other computers, such as by Ethernet connection.

Each scheduler 200 stores and executes a scheduler program, which enables the scheduler 200 to manage requests issued by its user computer 100 and to match them with computing facilities offered by task computers 300. The scheduler program can be introduced to the scheduler 200 by way of a download computer program product, or a storage medium computer program product; this is implementation specific.

Figure 4:
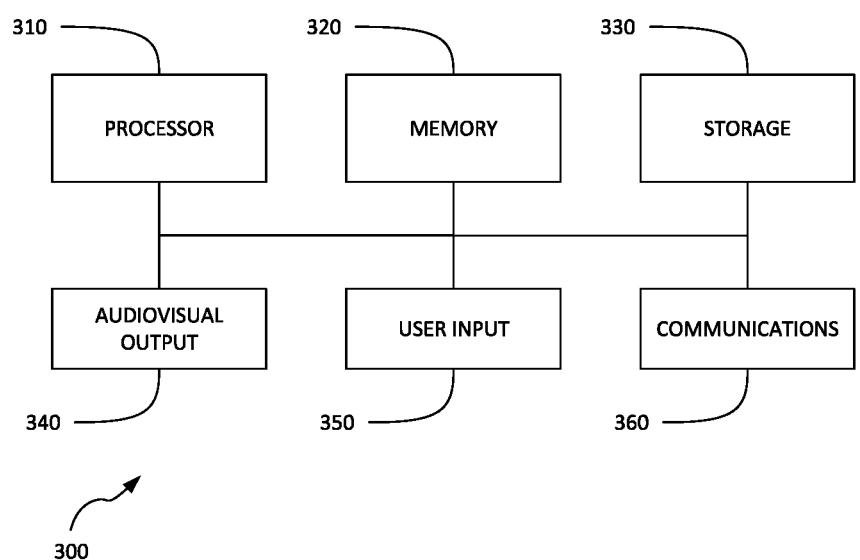
FIG. 4 is a schematic architecture of a task computer of FIG. 1.

As shown in FIG. 4, each task computer 300 comprises a processor 310, a memory 320 for short term retention of processing data, and storage 330 for long term (but potentially slow retrieval) storage of program, processing and informational data. In conventional implementations, the storage 330 may comprise a magnetic drive, or a solid-state storage device. An audio-visual output facility 340 is provided, such as a visual display unit and speakers, for display and audio output to a user, and a user input device 350, such as a keyboard, pointing device (e.g. mouse) and microphone are provided to enable user input action to the scheduler 300. A communications facility 360 provides connection to other computers, such as by Ethernet connection.

As the task computers 300 may be edge computing devices, in that they provide an interface between local computation facilities and more distributed computation facilities, other forms of computer connections may also be provided, such as internet access to wider networks such as the World Wide Web. This may enable a task computer 300, as the need arises, to recourse to other computation facilities for the performance of requested tasks. As illustrated, other networked computing resources are shown as being available, by cloud computing. The reader will appreciate that reference to cloud computing merely implies recourse to wider computing resources than those locally available, either from a specific node or a distributed process over a plurality of computing network nodes.

Each task computer 300 stores and executes a task computer program, which enables the task computer 300 to offer task computation facilities to the scheduler 200 and thence to the user computers 100. This program can be introduced to the task computer 300 by way of a download computer program product, or a storage medium computer program product; this is implementation specific.

Figure 5:
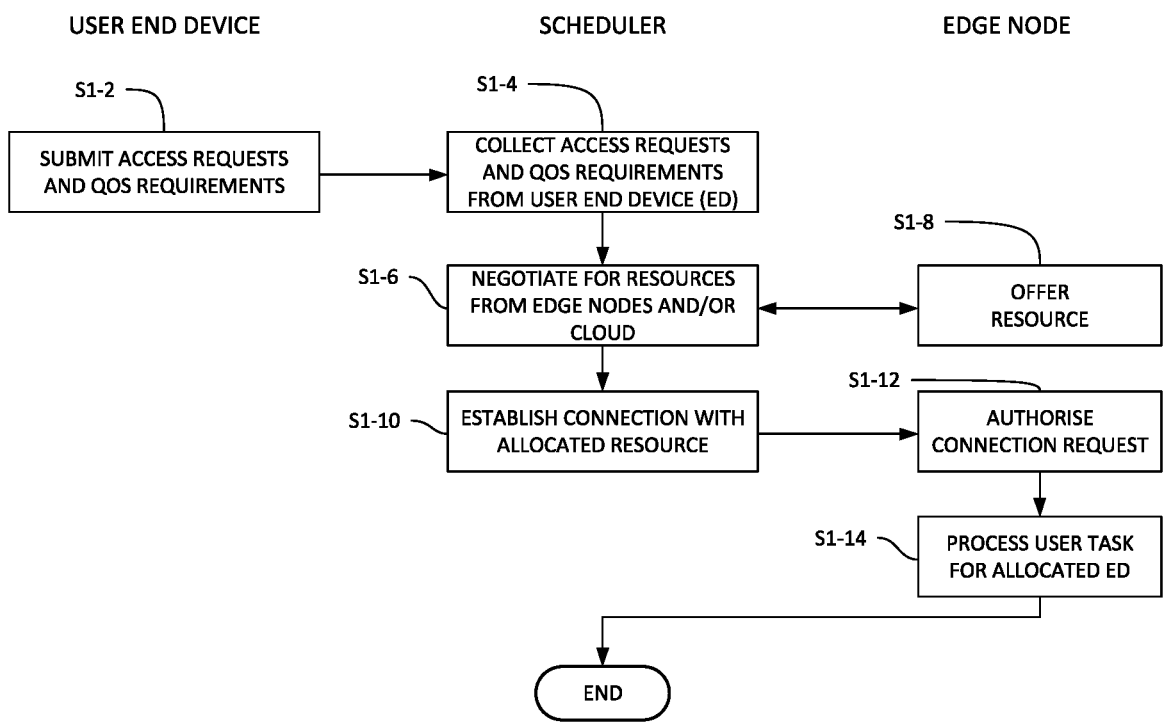
FIG. 5 is a swim-lane flow diagram of a procedure of allocating and executing tasks in accordance with an embodiment.

FIG. 5 shows the main process for resource allocation in accordance with the disclosed embodiment.

As shown in FIG. 5, a swim-lane diagram is illustrated indicating the processes and workflows between a user device (end device, ED) 100 and its associated scheduler 200, together with a nominated edge node (EN) acting as a task computer 300.

In step S1-2 an ED 100 submits access requirements and quality of service (QoS) requirements for a processing task, to the scheduler 200 associated with that ED 100.

The scheduler 200 then, in step S1-4, collects the access requirements and QoS requirements from the user end device 100.

In step S1-6, the scheduler 200 negotiates with all available and accessible edge nodes (EN) and cloud services. The negotiation and allocation process carried out by the scheduler and the edge nodes is described in further detail below. FIG. 5 shows the nominated EN 300 offering processing resource in step S1-8.

In step S1-10, a connection is established with the allocated resource which, in this case, is the nominated EN 300. Then, in step S1-12, the connection request made by the scheduler 200 is accepted and authorised by the nominated EN 300. The user task is then processed by the allocated ED 300 in step S1-14. The process then ends.

The resource allocation process used in steps S1-6 and S1-8 will now be described in further detail. In general terms, the resource allocation process is a dynamic process. At any moment in time when any scheduler 200 has a waiting task, it requests the network side (ENs and the Cloud) for computing capacity. With the Cloud connection, even if local ENs are fully allocated, there should always be at least some available computing resource. The status of the computing resources, i.e., available capacity, processing speed, geographic locations, etc., are known to the schedulers 200. The scheduler collects user QoS requirements along with the access request, which provides the fundamental reference for establishing preference in the choices of resources.

A computing resource at the edge network can determine whether it will accept the computing request from the user (via its scheduler). In this example, the case where a user requests resources from an edge node greater than the capacity of that edge node is not considered, as the scheduler holds information as to the operational capability of edge nodes and so will not propose to that resource. The preference of the computing resource on serving different user requests is defined by the individual resources according to its own operational configuration/criteria, such as first come first serve or serve the most profitable task.

Note that a computing resource (such as the Cloud) may have several parallel processing units. However, for the purpose of this disclosure, each processing unit is treated as a separate entity. That is, it is assumed that one user task will be processed by one computing unit, and each computing unit has full operational functions such as defining preferences.

For the purpose of this example, one to one matching is considered for the resource allocation steps. That is, in the present case, N user tasks are to be matched to N computational resources.

The presently disclosed method aims to conduct only a limited number of proposing operations to avoid redundant proposing and proposal checking. This will confer advantage in terms of time efficiency of the matching process. Only a selection of EDs propose each time. In addition, some EDs could have their matches to ENs fixed before the end of the process. This means that those EDs would not need to keep proposing, and the remaining EDs would not need to continue proposing to the matched ENs. Once an ED has had its match to an EN fixed by the process, it can proceed with obtaining resource from that EN—it does not need to wait for the whole matching process to complete.

This can result in significant advantage in terms of algorithmic complexity and system signalling overhead.

In comparison with static matching, embodiments of the matching method disclosed herein achieve the same stable outcome. A static scenario for allocation of N resources is that matching commences when the number of requests has reached N, and will not change for some time. Also, actual data processing will commence when the whole matching process is finished. In such case, a user device will usually wait for a significant time before its application can be processed. This impacts the system less when it already has a long queue of requests, i.e. the number of requests greatly exceeds N. However, in a more realistic dynamic scenario in which user requests arrive at different times and cannot wait for long, that approach to allocation may not be desirable.

Embodiments disclosed herein use a termination mechanism to stop the updating of preference lists (PLs) during the matching process. The matching result is optimal to the user and stable at the point of termination.

Figure 6:
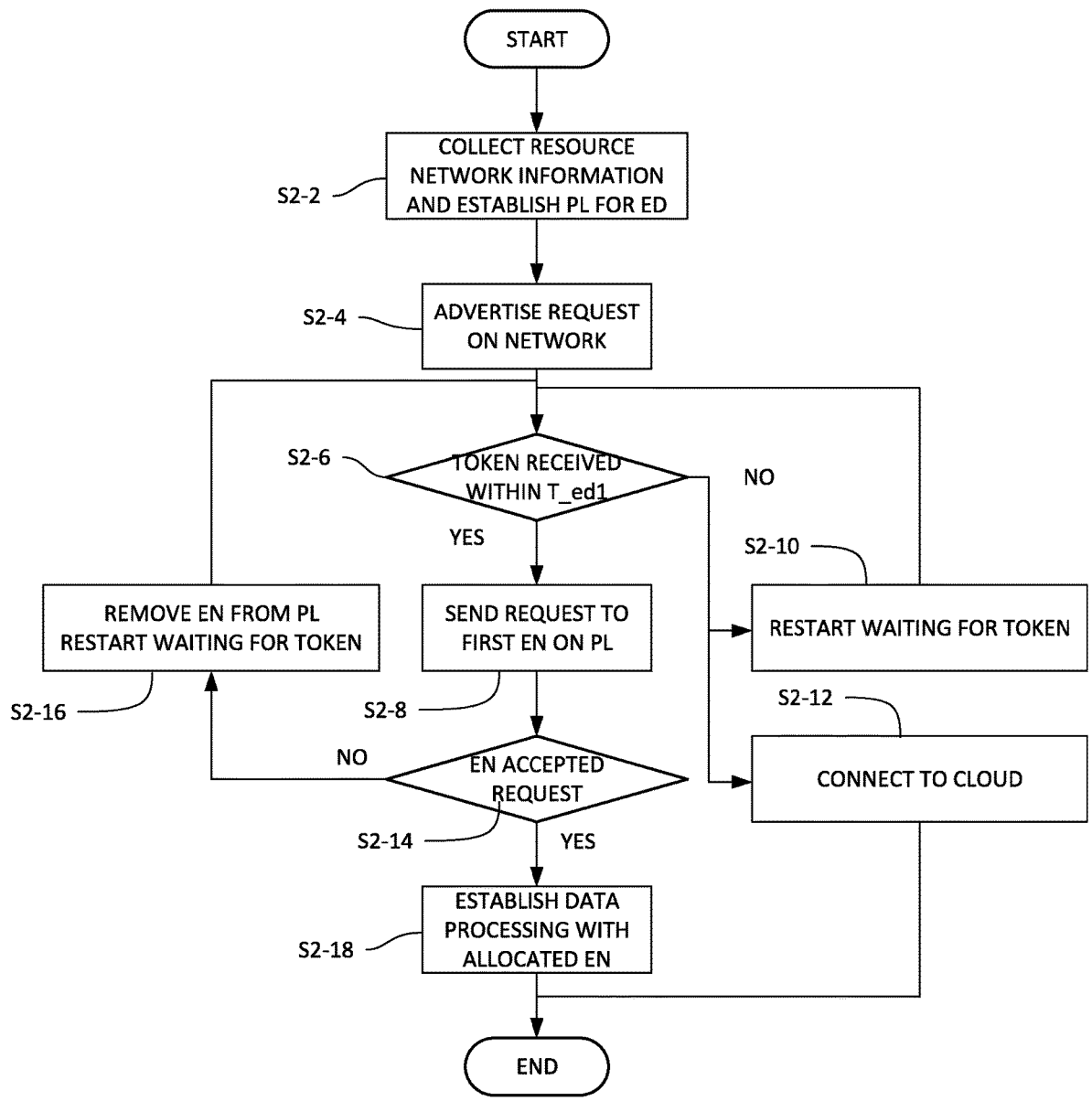
FIG. 6 is a flow diagram for a procedure performed at a scheduler for scheduling tasks to resources in the procedure of FIG. 5.
Figure 7:
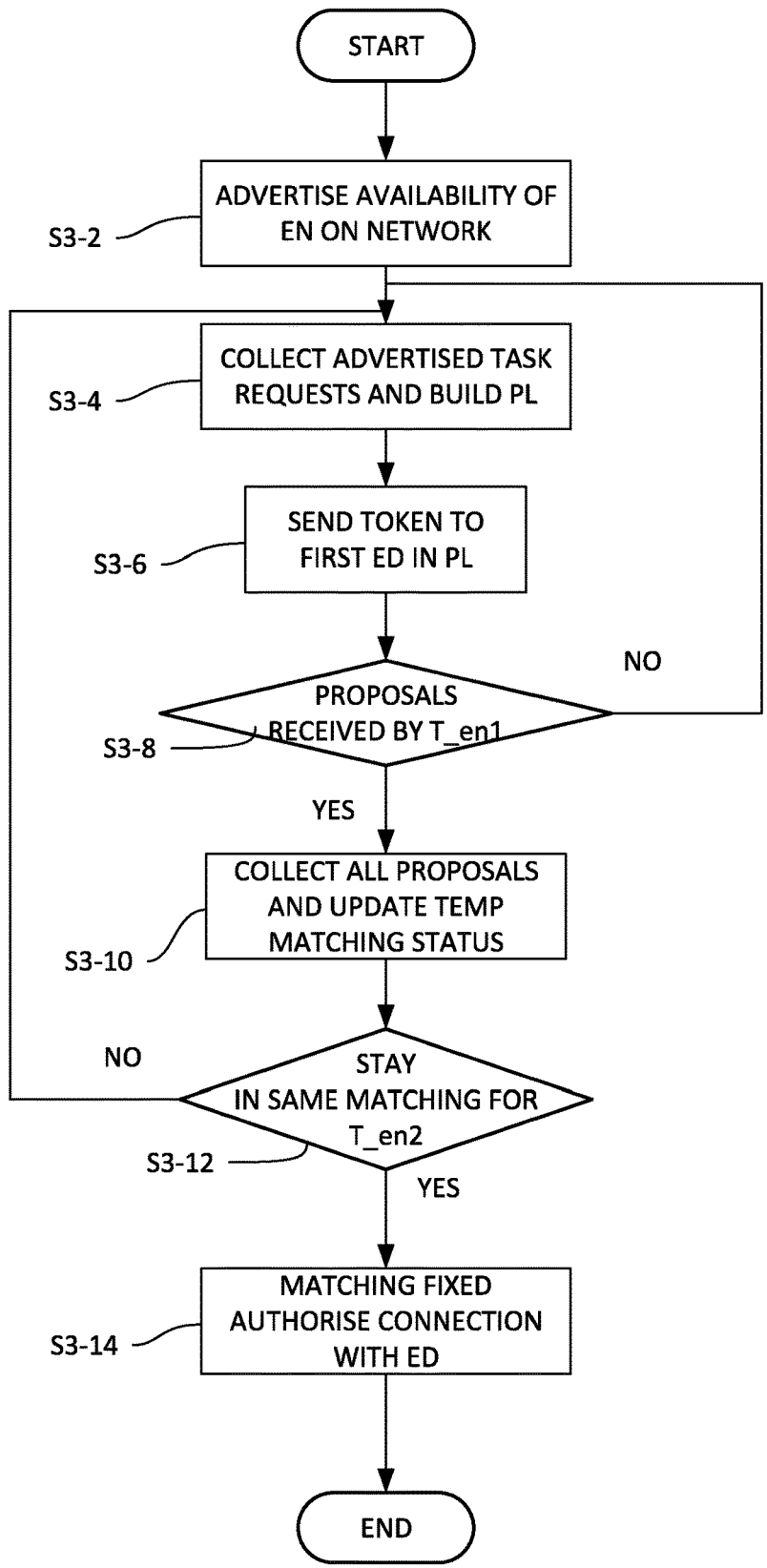
FIG. 7 is a flow diagram for a procedure performed at an edge node for scheduling tasks to resources in the procedure of FIG. 5.

FIGS. 6 and 7 depict flow charts of the matching method of the disclosed embodiment, respectively from the perspective of the ED and the EN. The disclosed method follows the following procedure, which is explained sequentially.

The schedulers collect user application requests (S2-2) and advertise these tasks (S2-4) on the computing network, in real time. Similarly, each EN advertises its resource on the network (S3-2).

Each entity (ED Scheduler and EN) establishes a preference list (PL) (S2-2, S3-4). The PL is a ranking created for each entity to represent its current preference over the entities at the other side. The preference at the ED can be based on the user's QoS requirement, or the service price charged by the resource provider. For example, one user may prefer the EN that has the fastest processing capacity or has the lowest price tag. As mentioned, the scheduler 200 collects the user information, and uses its information of the computing resources within the network to generate the PL for the ED.

Each of the schedulers operates individually in that the PL it generates for its respective user is private for the corresponding user. No information as to the user's task requirement or as to its preference for any particular network resource is shared with other schedulers. This is an important security feature to prevent information disclosure when the user has no trust of other users, or of the other schedulers on the network. The disclosed embodiment does not rely on exchange of user information with other schedulers.

In step S3-6, the EN issues a token to the scheduler for the first ED on its PL. In step S3-8, the EN will wait for a predefined time T_en1 to receive proposals. Correspondingly, in step S2-6, the scheduler for an ED waits for receipt of a token from an EN, for a predefined time T_ed1.

On receipt of a token, the ED scheduler sends service requests to the first EN resource on its PL (S2-8). Note here that the EN resource that the ED sends its service request to is not necessarily the EN that had issued the token received by the ED.

The scheduler will wait (S2-6) for response from a proposing EN until expiry of T_ed1, a timeout mechanism used to terminate the waiting. If there is a timeout, the scheduler can decide whether to wait for a new opportunity to propose (S2-10), or to connect to the cloud (S2-12).

After T_en1, an EN that has received proposals (S3-8) from EDs decides the connection choice depending on its current matching status (S3-10).

If the EN is unmatched, the EN and the proposing ED form a new temporary matching pair. In the event that proposals are received from a plurality of EDs, the EN chooses the ED in accordance with PL ranking. That is, it selects the proposing ED which it most prefers.

If the EN is currently temporarily matched with another ED, it decides whether to accept or reject the proposing ED (change to a new pairing or remain in current) according to its own preference.

If an ED is rejected, the scheduler removes the corresponding EN from its PL.

ENs continue to listen to new adverts and update their PLs (S3-4), issue tokens (S3-6). EDs response to new tokens (S2-6). A temporarily matched EN can change its matching pair if it receives a more preferred proposal.

Temporary matching status will last for a second predefined period T_en2. After T_en2 (S3-12), the matching will be fixed (S3-14). This is communicated to the successful ED (S2-14). The user connection is established by the scheduler (S2-18). Any EN that has fixed matching established announces its status to the network. The EN is no longer available for matching, i.e., removed from every PL (S2-16) until the task has been processed and the node re-announces its availability.

Different mechanisms can be provided as a termination condition, such as when the total proposals received has reached the maximum number.

The process terminates when no unmatched user exists.

In an environment where using the cloud computing resource is acceptable to the user, the scheduler can consider the need to upload the computing task to the cloud when the user's requirement is better satisfied by cloud services. In this case, the scheduler includes "the cloud" as a separate entry into the PL of the user. The cloud is assumed to be capable of accepting any request.

If the cloud is ranked $1^{st}$ for a user, the scheduler would immediately match the ED to the cloud, before the matching process begins. That user task would be scheduled to be processed in the cloud.

The scheduler can choose to process part (if the computing task is dividable) or all the computing tasks to the cloud. A separate scheduling policy can be applied to optimise such a split subject to requirements (such as processing delay and economic cost) of the user. For example, in order to minimise task processing delay, an optimal split can be estimated by solving the optimisation below:

$$\underset{V_{EN}}{\text{minimize}} \quad \alpha \cdot \frac{V_{EN}^3}{P_{EN}} + \beta \cdot V_{CLOUD}^2 + \gamma \cdot \frac{V_{CLOUD}^3}{P_{CLOUD}}$$

where $V_{EN}$ and $V_{CLOUD}$ are the amount of data volume to be processed by the edge resources and the cloud, respectively, $P_{EN}$ and $P_{CLOUD}$ are the edge and cloud's CPU processing power, respectively, and $\alpha$, $\beta$, $\gamma$ are coefficients that are subject to individual networks.

The processing of the split $V_{EN}$ will then enter the matching process. As the reader will appreciate, this splitting of tasks into parts does not alter the approach to matching of tasks (or parts of tasks) to resources.

Embodiments are described in the context of implementation of executable software being executed on suitably configured hardware. However, the reader will appreciate that other implementations are possible, including greater or complete reliance on application specific hardware devices. Further, while a software implementation may be achieved by execution of a software product on a hardware device, the reader will appreciate that a more distributed approach may be achievable, including obtaining software functionality from a remote location such as a "cloud based" service.

The embodiments described above are intended to be indicative, and are not limiting on the scope of protection sought, which should be determined on the basis of the claims appended hereto.

The invention claimed is:
1. A method comprising:
   obtaining resource information defining available computing resources, a task requested by a requesting computer being allocated to one of a plurality of available computing resources, in a system including a plurality of computers capable of requesting the task to be performed by one of the plurality of computing resources;
   establishing a preference list of the available computing resources;

issuing an advertised task request to the available computing resources indicating a request for computing resource and awaiting a resource request processing token;

the method being responsive to receipt of the resource request processing token acknowledging the request, by:

selecting from the preference list of the available computing resources an available computing resource with highest preference and sending a proposal message to the selected available computing resource;

wherein each available computing resource is operable on receipt of the proposal message to:

establish a temporary matching to a task requesting computer from which the proposal message has been sent;

on expiry of a predetermined time period, issue an acceptance message to the task requesting computer of a temporarily matched proposal; and responsive to receipt of the acceptance message from the selected available computing resource corresponding to the proposal message, establish a data processing connection with an accepting resource or, in the absence of receipt of the acceptance from the selected available computing resource, remove the selected computing resource from the preference list and revert to awaiting the resource request processing token.

2. A method in accordance with claim 1 wherein waiting for receipt of the resource request processing token is conducted for a predetermined waiting period, and wherein the method determines absence of receipt of the resource request processing token on expiry of the predetermined waiting period.

3. A method in accordance with claim 2 wherein, on expiry of the predetermined waiting period without receipt of the resource request processing token, either restarting the predetermined waiting period or obtaining resource from a computing resource beyond the system.

4. A method in accordance with claim 3 wherein the computing resource beyond the system is a cloud-based computing resource.

5. A method in accordance with claim 1 comprising, at a computing resource of the system:

obtaining advertised task requests from the computers requesting the task;

assembling a preference list of the computers requesting the task;

issuing the resource request processing token to the computer on the preference list of the computers with the highest preference;

awaiting the proposal message from the computer to which the resource request processing token has been sent;

on receipt of the proposal message, temporarily matching to the computer from which the proposal message has been sent;

for the predetermined time period, monitoring for further advertised task requests which have higher preference than the temporarily matched proposal and, on receipt of such a task request, issuing the resource request processing token to the higher preference computer, awaiting a proposal message from the higher preference computer and, on receipt of a proposal message from the higher preference computer, revising the temporary matching to the higher preference computer;

on expiry of the predetermined time period, fixing the temporary matching to the temporarily matched proposal.

6. A computer system comprising a plurality of computers capable of requesting a task, and a plurality of computing resources capable of performing a requested task, wherein each computer capable of requesting the task has associated therewith a scheduler allocated to that computer and to no other computer in the system, wherein each scheduler for a computer requesting the task is operable to:

obtain resource information defining available computing resources;

establish a preference list of the available computing resources; and issue an advertised task request to the available computing resources indicating a request for computing resource and to await a resource request processing token;

wherein each available computing resource is operable to:

obtain advertised task requests from computers requesting the task;

assemble a preference list of the computers requesting the task;

issue the resource request processing token to the computer on the preference list of the computers with the highest preference;

wherein each scheduler is responsive to receipt of the resource request processing token acknowledging the request, by selecting from the preference list of the available computing resources an available computing resource with the highest preference and sending a proposal message to the selected available computing resource;

wherein each available computing resource is operable on receipt of the proposal message, to:

establish a temporary matching to the task requesting computer from which the proposal message has been sent;

for a predetermined time period, monitor for further advertised task requests which have higher preference than the temporarily matched proposal and, on receipt of such a task request, issue the resource request processing token to the higher preference computer, await a proposal message from the higher preference computer and, on receipt of a proposal message from the higher preference computer, revise the temporary matching to the higher preference computer;

on expiry of the predetermined time period, fix the temporary matching to the temporarily matched proposal and issue an acceptance message to the task requesting computer of the temporarily matched proposal;

wherein the scheduler is operable on receipt of the acceptance message to establish a data processing connection with an accepting resource.

7. A scheduler for scheduling a computing task requested by a computer associated with the scheduler to one of a plurality of computing resources capable of performing a requested task, the scheduler being operable to:

obtain resource information defining available computing resources;

establish a preference list of the available computing resources;

issue an advertised task request to the available computing resources indicating a request for computing resource; and await a resource request processing token from one of the available computing resources;

wherein the scheduler is responsive to receipt of the resource request processing token acknowledging the request, by selecting, from the preference list of the available computing resources, an available computing resource with highest preference on the preference list and sending a proposal message to the selected available computing resource;

wherein each available computing resource is operable on receipt of the proposal message to:
  establish a temporary matching to a task requesting computer from which the proposal message has been sent;
  for a predetermined time period, monitor for further advertised task requests which have higher preference than a temporarily matched proposal and, on receipt of such a task request, issue the resource request processing token to a higher preference computer, await a proposal message from the higher preference computer and, on receipt of a proposal message from the higher preference computer, revise the temporary matching to the higher preference computer; and
  on expiry of the predetermined time period, fix the temporary matching to the temporarily matched proposal and issue an acceptance message to the task requesting computer of the temporarily matched proposal, and
wherein the scheduler is operable on receipt of the acceptance message to establish a data processing connection with an accepting resource.

8. A computer configured to provide a computing resource able to perform tasks requested by another computer in a computer system comprising a plurality of computers capable of requesting a task, wherein the computing resource is operable to:
  obtain advertised task requests from computers requesting the task;
  assemble a preference list of the computers requesting the task;
  issue a resource request processing token to the computer on the preference list with the highest preference;
  the computing resource being configured to receive a proposal message from a task requesting computer to the computing resource and, on receipt of a proposal message, to:
  establish a temporary matching to the task requesting computer from which the proposal message has been sent;
  for a predetermined time period, monitor for further advertised task requests which have higher preference than the temporarily matched proposal and, on receipt of such a task request, to issue the resource request processing token to a higher preference computer, to await a proposal message from the higher preference computer and, on receipt of a proposal message from the higher preference computer, revise the temporary matching to the higher preference computer;
  on expiry of the predetermined time period, fix the temporary matching to the temporarily matched proposal and issue an acceptance message to the task requesting computer of the temporarily matched proposal;
  establish a data processing connection with the matched task requesting computer.

9. A non-transitory computer readable medium having stored thereon software instructions that, when executed by a processor, cause the processor to execute steps comprising:
  obtaining resource information defining available computing resources, a task requested by a requesting computer being allocated to one of a plurality of available computing resources, in a system including a plurality of computers capable of requesting the task to be performed by one of the plurality of computing resources;
  establishing a preference list of the available computing resources;
  issuing an advertised task request to the available computing resources indicating a request for computing resource and awaiting a resource request processing token; and
  the steps being responsive to receipt of the resource request processing token acknowledging the request, by:
  selecting from the preference list of the available computing resources an available computing resource with highest preference and sending a proposal message to the selected available computing resource;
  wherein each available computing resource is operable on receipt of the proposal message to:
    establish a temporary matching to a task requesting computer from which the proposal message has been sent;
    on expiry of a predetermined time period, issue an acceptance message to the task requesting computer of a temporarily matched proposal; and
    responsive to receipt of the acceptance message from the selected available computing resource corresponding to the proposal message, establish a data processing connection with an accepting resource or, in the absence of receipt of the acceptance message from the selected available computing resource, remove the selected computing resource from the preference list and revert to awaiting the resource request processing token.

10. A method of allocating a task requested by a requesting computer, to one of a plurality of available computing resources, in a system including a plurality of computers capable of requesting the task to be performed by one of the plurality of computing resources, the method comprising:
  obtaining resource information defining available computing resources;
  establishing a preference list of the available computing resources;
  issuing an advertised task request indicating a request for computing resource and awaiting a resource request processing token;
  the method being responsive to receipt of the resource request processing token acknowledging the request, by:
  selecting from the preference list of the available computing resources an available computing resource with highest preference and sending a proposal message to the selected available computing resource;
  responsive to receipt of an acceptance from the selected available computing resource corresponding to the proposal message, establishing a data processing connection with an accepting resource or, in the absence of receipt of the acceptance from the selected available computing resource, removing the selected computing resource from the preference list and reverting to awaiting the resource request processing token, the method further comprising, at a computing resource of the system:

obtaining advertised task requests from the computers requesting the task;

assembling a preference list of the computers requesting the task;

issuing the resource request processing token to a computer on the preference list of the computers with the highest preference;

awaiting the proposal message from the computer to which the resource request processing token has been sent;

on receipt of the proposal message, temporarily matching to the computer from which the proposal message has been sent;

for a predetermined time period, monitoring for further advertised task requests which have higher preference than the temporarily matched proposal and, on receipt of such a task request, issuing the resource request processing token to the higher preference computer, awaiting a proposal message from the higher preference computer and, on receipt of a proposal message from the higher preference computer, revising a temporary matching to the higher preference computer;

on expiry of the predetermined time period, fixing the temporary matching to the temporarily matched proposal.

* * * * *